(12) United States Patent
Kraus

(10) Patent No.: US 6,241,104 B1
(45) Date of Patent: Jun. 5, 2001

(54) MOTORCYCLE STAND

(76) Inventor: Terrence Donald Kraus, 4147 Alcazar St., Albuquerque, NM (US) 87109

( * ) Notice: Subject to any disclaimer, the term of this patent is extended or adjusted under 35 U.S.C. 154(b) by 0 days.

(21) Appl. No.: 09/198,071

(22) Filed: Nov. 23, 1998

Related U.S. Application Data (63) Continuation-in-part of application No. 08/867,504, filed on Jun. 2, 1997, now abandoned.

(51) Int. Cl.$^7$ ........................................................ A47F 7/00
(52) U.S. Cl. ........................ 211/20; 224/924; 224/42.12
(58) Field of Search ................................. 211/20, 22, 5; 224/42.12, 924; 70/235

(56) References Cited

U.S. PATENT DOCUMENTS

| | | | |
|---|---|---|---|
| 481,751 | * 8/1892 | Engler | 224/42.12 |
| 3,204,839 | * 9/1965 | Yuda et al. | 224/42.12 |
| 3,225,986 | * 12/1965 | Anderson | 224/42.12 X |
| 3,628,209 | * 12/1971 | Parent | 14/71 |
| 3,658,360 | * 4/1972 | Wood | 280/302 |
| 4,077,607 | * 3/1978 | Lovelady | 254/88 |
| 4,113,235 | 9/1978 | Hartman, Jr. | |
| 4,182,454 | 1/1980 | Tohms | |
| 4,189,274 | * 2/1980 | Shaffer | 414/462 |
| 4,273,484 | * 6/1981 | Blanar | 410/12 |
| 4,355,807 | * 10/1982 | Prehodka | 273/86 R |
| 4,420,164 | * 12/1983 | Mitchell | 280/293 |
| 4,437,597 | 3/1984 | Doyle | |
| 4,629,104 | * 12/1986 | Jacquet | 224/324 |
| 4,864,936 | * 9/1989 | Rietsch, Jr. | 104/172.1 |
| 4,921,152 | 5/1990 | Kemming | |
| 5,301,817 | 4/1994 | Merritt | |
| 5,427,286 | * 6/1995 | Hagerty | 224/42.03 B |
| 5,462,398 | * 10/1995 | Hymer | 414/462 |
| 5,509,776 | * 4/1996 | Specht et al. | 224/924 X |
| 5,518,224 | 5/1996 | Anderson | |
| 5,598,595 | * 2/1997 | Flinchum | 14/69.5 |
| 5,639,067 | * 6/1997 | Johnson | 254/131 |
| 5,643,141 | * 7/1997 | Lee | 482/52 |
| 5,735,410 | * 4/1998 | Kallstrom | 211/20 |
| 5,988,402 | * 11/1999 | Mayfield | 211/20 |

* cited by examiner

Primary Examiner—Daniel P. Stodola
Assistant Examiner—Khoa Tran
(74) Attorney, Agent, or Firm—Rod D. Baker (57) ABSTRACT

A motorcycle stand designed for hands-free operation that enables the rider to safely park a motorcycle in a secured, upright position without the aid of another individual and without having to dismount from the motorcycle. The motorcycle stand includes: rigid base; adjustably attached ramp; ramp-locking device; wheel stop; pairs of adjustably attached and opposing wheel supports; and a multitude of anti-skid pads. The wheel supports guide the wheel into the parking position and engage the sides of the front wheel. The weight of the motorcycle ensures the front wheel is engaged in the motorcycle stand such that the motorcycle cannot be moved forward, backward, or tipped from side-to-side. The steep inclination of the ramp and a locking device prevent the parked motorcycle from accidentally rolling backward and out of engagement with the motorcycle stand, even when the motorcycle is parked on an inclined surface. The position of the ramp and wheel supports can be adjusted to accommodate wheels of different widths and diameters. The stand is sized and configured such that it does not interfere with the motorcycle's front fender, brake rotor, and lower fairing. The stand is light weight, of simple and inexpensive construction, and easy to transport, operate, and deploy.

14 Claims, 9 Drawing Sheets

MOTORCYCLE STAND

CROSS-REFERENCE TO RELATED APPLICATIONS

This application is a continuation-in-part application of U.S. Pat. application Ser. No. 08/867,504, entitled "Motorcycle Stand", to Kraus, filed on Jun. 2, 1997, now abandoned, and the specification thereof is incorporated herein by reference.

BACKGROUND OF THE INVENTION

1. Field of the Invention

This invention relates in general to motorcycle stands, and in particular, to stands for roadrace motorcycles.

2. Background Art

Motorcycles used in roadrace competition are not equipped with a kickstand that can be used to park the motorcycle, because safety issues dictate that kickstands be removed from motorcycles used in competition. Frequently it is not convenient or appropriate to park the motorcycle by leaning it against a wall, post, or other object. Therefore, a device is needed to support the motorcycle in an upright position when it is parked. Conventional motorcycle stands do not provide a suitable means to park a roadrace motorcycle. Conventional stands are designed to lift the front, rear, or entire motorcycle off the ground to ease maintenance (e.g., wheel changes). Many current stand designs require two operators to safely park a motorcycle; one operator must balance and stabilize the motorcycle while the other operator uses a lever-action-type jack to raise and secure the front, rear, or center of the motorcycle. It is very difficult for one operator to safely use these stands because it is difficult to stabilize the motorcycle with one hand while engaging the device with the other hand or a foot. Inevitably, situations occur where no one is immediately available to help the rider engage the stand to park the motorcycle. This is especially a problem when an exhausted rider returns to the racetrack pit area and no one is available to help park the motorcycle. The rider must either wait for a helper to arrive, or attempt to park the motorcycle without assistance. Unfortunately, riders occasionally loose control and drop their motorcycle while trying to park the motorcycle by themselves. Dropping the motorcycle can damage the motorcycle and cause personal injury. Another deficiency of some conventional stand designs is that, in an effort to keep the devices small and compact, the designs incorporate short levers that provide insufficient mechanical advantage thereby making it difficult for some operators to raise the motorcycle to the parked position. Still another deficiency of some conventional stand designs is that, although one operator can safely park some types (e.g., off-road) of motorcycle, the stands cannot be used on many roadrace motorcycle designs. The final deficiency of conventional stand designs is that the rider must or should dismount the motorcycle before the motorcycle can be parked.

Still another deficiency of some conventional stand designs is that they engage only the lower part of the motorcycle wheel and do not engage the top part of the wheel. This design requires the lower part of the wheel to be tightly engaged (i.e., squeezed) which makes it difficult to park and un-park the motorcycle and can damage or deform race tires which are often made of soft rubber compounds. Also, many conventional stands can not be used to secure a motorcycle during transport in a manner that does not require the motorcycle's front suspension forks to be compressed in order to stabilize the motorcycle.

Various devices and methods have been proposed to provide a means to park a motorcycle that is not equipped with a kickstand.

U.S. Pat. No. 4,113,235 discloses a lever-action lift jack that is intended to be used to raise and support a motorcycle. The device does not provide a suitable means to park a roadrace motorcycle because the device engages the midsection of the undercarriage of the motorcycle, which is frequently covered by a fairing or blocked by components (e.g., exhaust system). Moreover, it is difficult for one person to safely park a motorcycle because it must be balanced and stabilized with one hand while using the other hand to position and engage the device.

U.S. Pat. No. 518,224 teaches a lever-action lift jack that is intended to be used to raise and support an "off-road" motorcycle. The device includes a bike-engaging and lifting rectangular platform pivotally secured to a base and to a foot-lever that is used to pivot and raise the rectangular platform. The device of U.S. Pat. No. 518,224 suffers from many of the same shortcomings as the '235 patent.

U.S. Pat. No. 301,817 discloses a security stand device that is intended to support a motorcycle in an upright manner and prevent the theft of the motorcycle. The device includes a base member, a backbone member that cradles the motorcycle wheel, a ramp, left and right side supports, support ribs to stabilize the side supports, a means to anchor the device to a supportive surface, and a locking cable. U.S. Pat. No. 301,817 teaches a complex, expensive means to park a motorcycle that would be difficult to use because it is not portable, but rather must be anchored to a supportive surface.

Other motorcycle stand designs are also known for parking a motorcycle that is not equipped with a kickstand. These other designs are similar to devices described above, in that they incorporate a lever-action-type jack to raise and secure either the front or rear of the motorcycle. These designs do not provide a suitable means to park a roadrace motorcycle because it is difficult for one operator to safely park a motorcycle since they must balance and stabilize the motorcycle with one hand while using the other hand to position and engage the device.

Whatever the precise merits, features and advantages of the above cited motorcycle stands, they do not achieve or fulfill the purposes of the present invention. There is no suitable alternative to the present invention that provides a superior method to park a motorcycle not equipped with a kickstand.

SUMMARY OF INVENTION

The principle object of the present invention is to provide a trouble-free means for one person to safely and securely park a motorcycle that does not require the rider to dismount before parking the motorcycle.

Another objective of the present invention is to provide a motorcycle parking device that allows the motorcycle to be easily removed from the device, when desired.

An additional objective of the present invention is to provide a hands- and feet-free means to safely park a motorcycle that does not require a single operator to balance and stabilize the motorcycle with one or both hands while using a hand or foot to operate a lever-action-type jack to raise the motorcycle to a parked position.

A further objective of the present invention is to provide a device that is noncomplex, lightweight, easy to operate, easy to transport, and of inexpensive construction It is also an objective of the present invention is to provide a device that can be easily adjusted to securely park motorcycles having front wheels of different widths and diameters.

Still another object of the present invention is to provide a means to secure the front end of a motorcycle during transportation in a manner that does not require the motorcycle's front forks to be compressed to stabilize the motorcycle.

Yet another objective of the present invention is to provide a device that does not have to be adjusted to engage the motorcycle after the motorcycle has been placed into the parking position.

The penultimate objective of the present invention is to provide a means to securely park a motorcycle that does not damage or deform tires made of soft rubber compounds often used in race tires construction.

The last objective of the present invention is to provide a means to park a wide variety of two-wheeled vehicles, including motorcycles designed for street and off-road use. The foregoing objectives, as well as other objectives that will become apparent from the discussion that follows, are achieved using the present invention.

One embodiment of the invention comprises a motorcycle stand including a U-shaped base having support legs at the anterior (i.e., closed) end of the U-shaped base to provide lateral support. A vertical support member is rigidly attached at the center of the closed end of the U-shaped base. Angled support braces stabilize the vertical support member and provide a rigid base to which a wheel stop is rigidly attached. The wheel stop is sized and configured to contact the leading edge of the motorcycle wheel and stop the forward motion of the motorcycle tire. A pair of opposing anterior wheel supports are adjustably attached to the motorcycle stand at a point near the wheel stop. The distance between the anterior wheel supports can be adjusted to securely engage wheels of different widths. The anterior wheel supports can also be rotationally adjusted to engage different areas of the motorcycle wheel to optimize the size of the contact patch between the wheel and the anterior wheel supports. The anterior wheel supports are sized and configured to guide the wheel into proper position and to securely engage the wheel when motorcycle is in the parking position.

A telescoping support arm is adjustable attached to the vertical support member. A pair of opposing upper wheel supports are adjustably attached at the upper end of the support arm. The distance between the upper wheel supports can be adjusted to engage wheels of different widths. The upper wheel supports can also be rotationally adjusted to engage different areas of the motorcycle wheel to optimize the size of the contact patch between the wheel and the upper wheel supports. The position of the upper wheel supports can be adjusted to securely engage wheels of different diameters by telescoping the support arm.

A ramp serving as both a loading and unloading ramp is rotationally attached between the legs of the U-shaped base near the posterior (i.e., open) end of the U-shaped base. The ramp is flipped (rotated) between the loading and unloading position by the front (or alternatively, rear) wheel which, after it rolls Up the inclined ramp and passes over the ramp's fulcrum, pushes (by the weight of the vehicle) the forward end of the ramp downward, allowing gravity to pull the motorcycle down the declined ramp. The longitudinal axis of the ramp is at an angle of approximately 25° with respect to the plane of the supportive surface when the ramp is in the loading and unloading positions. The ramp prevents the parked motorcycle from accidentally rolling backward and out of engagement with the motorcycle stand. A locking device locks the ramp in the parking position to ensure the motorcycle will not roll backward and out of engagement with the motorcycle stand, even when the motorcycle is parked on an inclined surface. The distance between the ramp and the front of the motorcycle stand can be adjusted to ensure the motorcycle stand securely engages wheels of different diameters. A pair of opposing posterior wheel supports are adjustably attached to opposing sides of the motorcycle stand near the ramp. The posterior wheel supports rotate with the ramp, guide the wheel into place as the motorcycle is being loaded into the motorcycle stand, and securely engage the wheel when the motorcycle is in the parking position. The posterior wheel supports are adjustably attached so that the distance between the wheel supports can be adjusted to securely engage wheels of different widths. The posterior wheel supports can also be rotationally adjusted to engage different areas of the wheel to optimize the size of the contact patch between the wheel and the wheel supports. A multitude of anti skid pads are attached to the bottom of the base of the motorcycle stand and prevent the motorcycle stand from moving while the motorcycle is loaded into, and unloaded from, the motorcycle stand.

The present invention is used to park a motorcycle by positioning the present invention on a supportive surface. The anterior, posterior, and upper wheel supports are adjusted to accommodate the width of the motorcycle wheel. The parking ramp and support arm are adjusted to accommodate the diameter of the motorcycle wheel. The motorcycle is ridden or pushed, in the forward direction so that the front wheel rolls up the parking ramp and over the ramp's fulcrum. Gravity then pulls the motorcycle down the ramp until the front wheel of the motorcycle comes to rest against the wheel stop. The distance between the wheel stop and the ramp is adjusted so that the front wheel is held above the supportive surface. The weight of the motorcycle ensures the front wheel of the motorcycle is securely engaged by the motorcycle stand. The ramp and the wheel stop prevent the motorcycle from moving forward or backward. The anterior and posterior wheel supports engage lower parts of the wheel below the axle and the upper wheel supports engage the top part of the wheel, above the axle. The upper wheel supports prevent the motorcycle from tipping to either side and enable the motorcycle to be held upright while the anterior and posterior wheel supports only lightly engage (i.e., not squeeze) the tire. Because the wheel does not have to be squeezed in between the opposing wheel supports, the motorcycle can easily be removed from the motorcycle stand and the soft rubber compounds, from which race tires are often constructed, are not damaged or deformed. To unload the motorcycle from the present invention, the rider stands at the side, grabs the motorcycle's handlebars, and then firmly pulls the handlebars backward to remove the motorcycle from the motorcycle stand. The inventive ramp is automatically rotated into the loading position when the motorcycle is removed enabling the motorcycle stand to be used to park another motorcycle without manually adjusting the motorcycle stand. The inventive design enables the present invention to securely park motorcycles having wheels of different diameters and widths. The present invention is sized and configured such that it does not interfere with the motorcycle's front fender, brake rotor, and lower fairing. The present invention can also be detachably, attached to a truck or trailer bed, using commercially available quick-release fasteners, and used to secure the front end of a motorcycle during transport in a manner that does not require the motorcycle's front suspension forks to be compressed in order to stabilize the motorcycle.

Another embodiment of the invention comprises a motorcycle stand including a ramp-like device that is adjustably attached to a rigid, rectangular-shaped base having support legs at each end to provide lateral support. A loading ramp and a parking ramp, which are rotatably attached to each other by a hinge device, comprise the ramp-like device. The hinge device is height-adjustably attached to the base such that the loading ramp is located near the posterior end of the present invention and the parking ramp is located anterior to the loading ramp. The posterior end of the loading ramp and the anterior end of the parking ramp are slidably attached to longitudinal slots in the medial sides of the base, such that the ends cannot be displaced vertically or horizontally but, are allowed to slide longitudinally as the hinge device is raised and lowered. Spring-actuated raising and locking devices are used to raise and lock the hinge devise in the raised (parking) position. A foot-operated, unlocking-lever is rotatably attached to the hinge device and is used to unlock the locking devise, thereby allowing the hinge devise to be lowered to the unloading (collapsed) position. A wheel stop is located anterior to the parking ramp and is rigidly attached to the base. A wheel support is located above the wheel stop and is rigidly attached to the wheel stop. The parking ramp, wheel stop, and wheel support have a U shaped cross section, and are sized and configured such that they are able to securely engage wheels of various diameters and widths. Rubber, anti-skid pads are attached to the bottom of the base.

This embodiment of the invention is used to park a motorcycle by positioning the present invention on a flat surface. The motorcycle is ridden or pushed, in the forward direction, up and over the top of the inclined loading ramp, and then the gravitational force is allowed to pull the motorcycle down the declined parking ramp until the front wheel of the motorcycle comes to rest against the wheel stop and wheel support. The weight of the motorcycle ensures the front wheel of the motorcycle is securely engaged by the parking ramp, the wheel stop, and the wheel support, such that the motorcycle cannot be moved in the forward, backward, or lateral directions, and the motorcycle is securely held in an upright, parked position. The inventive design of the parking ramp, wheel stop, and wheel support ensure that the present invention can secure motorcycles having front wheels of various diameters and widths. The present invention is sized and configured such that it does not interfere with the motorcycle's front fender, brake rotor, and lower fairing. To unload the motorcycle from this embodiment, the rider stands at the side of the motorcycle and stabilizes the motorcycle, and then, using a foot, presses the unlocking lever downward until the ramp like device is unlocked and falls to the unloading position. The rider then simply rolls the motorcycle backward and away from the present invention. After the motorcycles is removed from the present invention, the spring-actuated raising and locking devices automatically raise and lock the hinge devise into the raised (parking) position, and the present invention can be re-used to park another motorcycle.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF PREFERRED EMBODIMENTS

Figure 1:
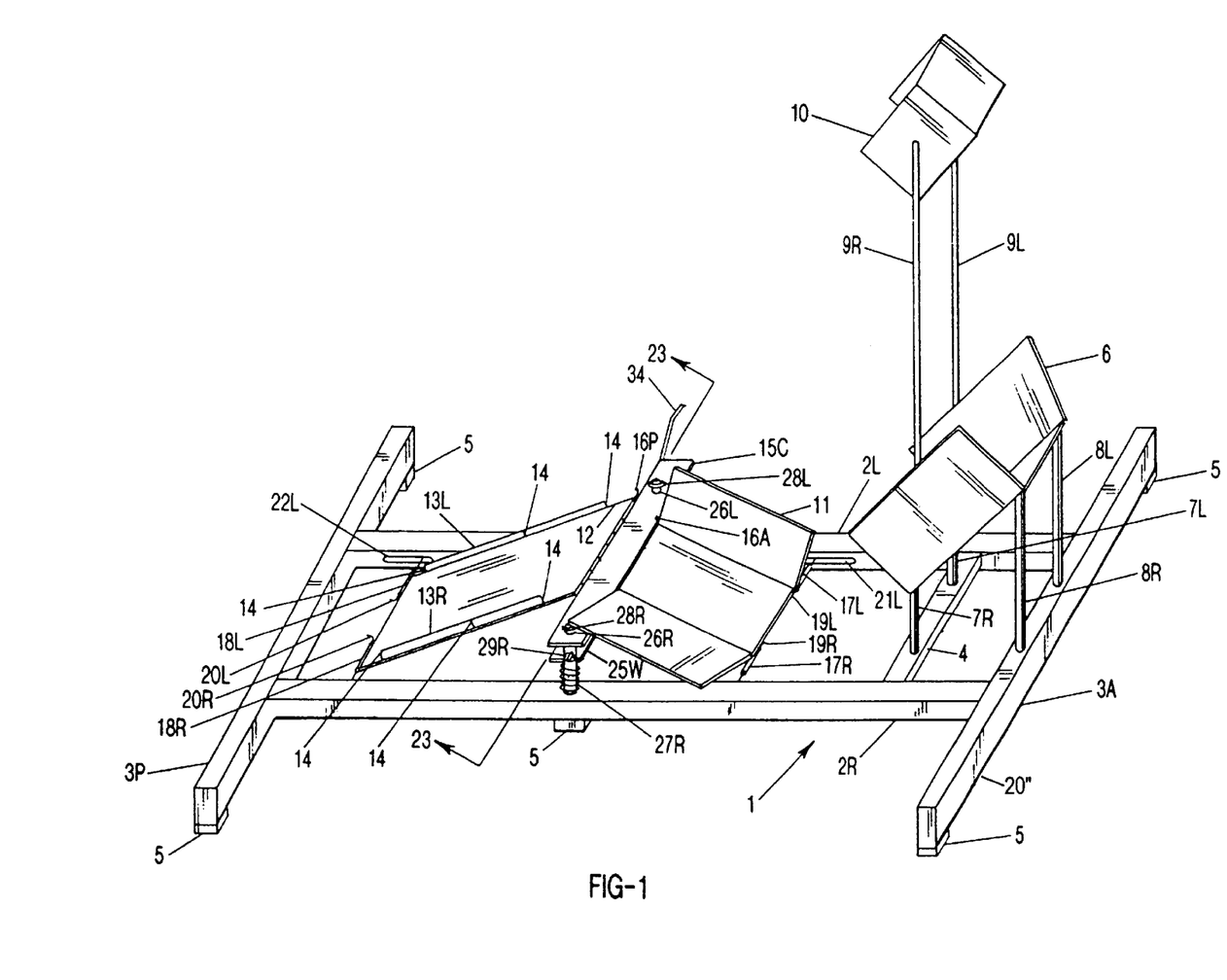
FIG. 1 is a perspective view of an alternative embodiment of the present invention shown in the parking (raised) position.

FIG. 1 shows an alternative embodiment of the inventive motorcycle stand 1. Dimensions and materials provided herein to describe the inventive stand 1 and its constituent elements are by way of example, not by limitation. Further, throughout the specification and the claims, "wheel" means the circular elements of the vehicle, such as a motorcycle, upon which the vehicle rolls across a supporting surface. "Wheel" includes the circumferential tire, it being understood that most motorcycle wheels are equipped with a pneumatic or semi-pneumatic tire according to convention. Motorcycle stand 1 is sized and configured so it can be used to park a wide variety two-wheel vehicle designs, particularly motorcycles, having wheels rotatably mounted upon axles. 2L and 2R are a pair of identical, spaced-apart (approximately 6.5"), parallel, base members, fabricated from 1" square tubular stock, approximately 34" in length. 3A and 3P represent the anterior and posterior lateral support members, respectively, also fabricated from 1" square tubular stock, approximately 20" in length. Lateral support members 3A and 3P are rigidly attached, such as by welding, to the anterior and posterior ends of base members 2L and 2R, respectively. A cross support member 4 also is fabricated from 1" square tubular stock, approximately 6.5" in length. Cross support member 4 is rigidly attached, such as by welding, to base members 2L and 2R approximately 4" from the anterior end of base members 2L and 2R. Base members 2L and 2R, lateral support members 3A and 3P, and cross support member 4 comprise the rectangular-shaped base of the present invention, which is disposed upon the supporting surface, such a floor or the ground, while the invention is in use. Anti-skid pad members 5, fabricated from rubber, are attached to the inferior surface of base members 2L and 2R, lateral support members 3A and 3P, and prevent motorcycle stand 1 from sliding when a motorcycle is loaded and unloaded, and when the invention is used on sloped surfaces. Lower anterior wheel stop member 6 prevents the front tire from rolling forward and helps secure the motorcycle in the parked position. Lower anterior wheel stop member 6 is sized and configured to securely hold wheels of various diameters and widths (i.e. lateral horizontal thickness). Wheel stop member 6 is fabricated from flat steel stock, approximately 6" in length and 13" in width, and is fabricated such that its cross-section is U-shaped having a base approximately 4" in width and two planar sides approximately 4.5" in height. The sides of lower anterior wheel stop member 6 taper out such that the distance between the two sides is approximately 4" at the base and 6" at the superior surface. Two pairs of identical wheel stop support leg members 7L and 7R, and 8L and 8R, are fabricated from steel rod stock, approximately 0.25" in diameter, and 3" and 8" in length, respectively. The superior ends of wheel stop support leg members 7L, 7R, 8L, and 8R are rigidly attached, such as by welding, to lower anterior wheel stop member 6. The inferior ends of wheel stop support leg members 7L and 7R are rigidly attached, such as by welding, to cross support member 4, and the inferior ends of wheel stop support leg members 8L and 8R are rigidly attached, such as by welding, to lateral support member 3A. Lower anterior wheel stop member 6 is attached such that its long axis is at an angle of approximately 55° in respect to the long axis of base members 2L and 2R. Elements 9L and 9R are a pair of identical wheel support, rod members fabricated from steel rod stock, approximately 0.25" in diameter and 14" in length. The inferior ends of wheel support rod members 9L and 9R are securely attached, such as by welding, to opposite sides of wheel stop member 6, such that wheel support rod members 9L and 9R are in perpendicular alignment with the long axis of base members 2L and 2R. The superior ends of wheel support rod members 9L and 9R are securely attached, such as by welding, to opposite sides of upper anterior wheel support member 10. Upper anterior wheel support member 10 is, fabricated from flat steel stock approximately 4" in length and having a cross-section that is identical to that of lower anterior wheel stop member 6, thereby enabling upper anterior wheel support member 10 to securely hold tires of various diameters and widths. Wheel support member 10 is positioned above lower anterior wheel stop member 6 such that it supports the superior or upper anterior surface, above the wheel axle, of wheels of various diameters and holds the parked motorcycle in an upright position. Parking ramp member 11 is fabricated from flat steel stock, approximately 8" in length, and having a cross-section that is identical to that of wheel stop member 6, thereby enabling parking ramp member 11 to securely hold wheels of various diameters and widths. Parking ramp member 11 prevents the front wheel from rolling backward and helps secure the motorcycle in the parked position. Element 12 is the loading ramp member over which the front wheel of the motorcycle rolls up to position the motorcycle in the parked position. Loading ramp member 12 is fabricated from flat steel stock, approximately 12" in length and 6" in width. A pair of identical guide rails 13L and 13R that guide the wheel up and down loading ramp member 12 as the motorcycle is loaded into and unloaded from the parked position. Guide rails 13L and 13R are fabricated from steel rod stock, approximately 0.125" in diameter and 12" in length, and are rigidly attached to loading ramp member 12 by an appropriate number of support rod members 14 fabricated from steel rod stock, approximately 0.125" in diameter and 1.5" in length. The posterior end of parking ramp member 11 is rotatably attached to the anterior end of loading ramp member 12 by a hinge 15 or equivalent.

Figure 2:
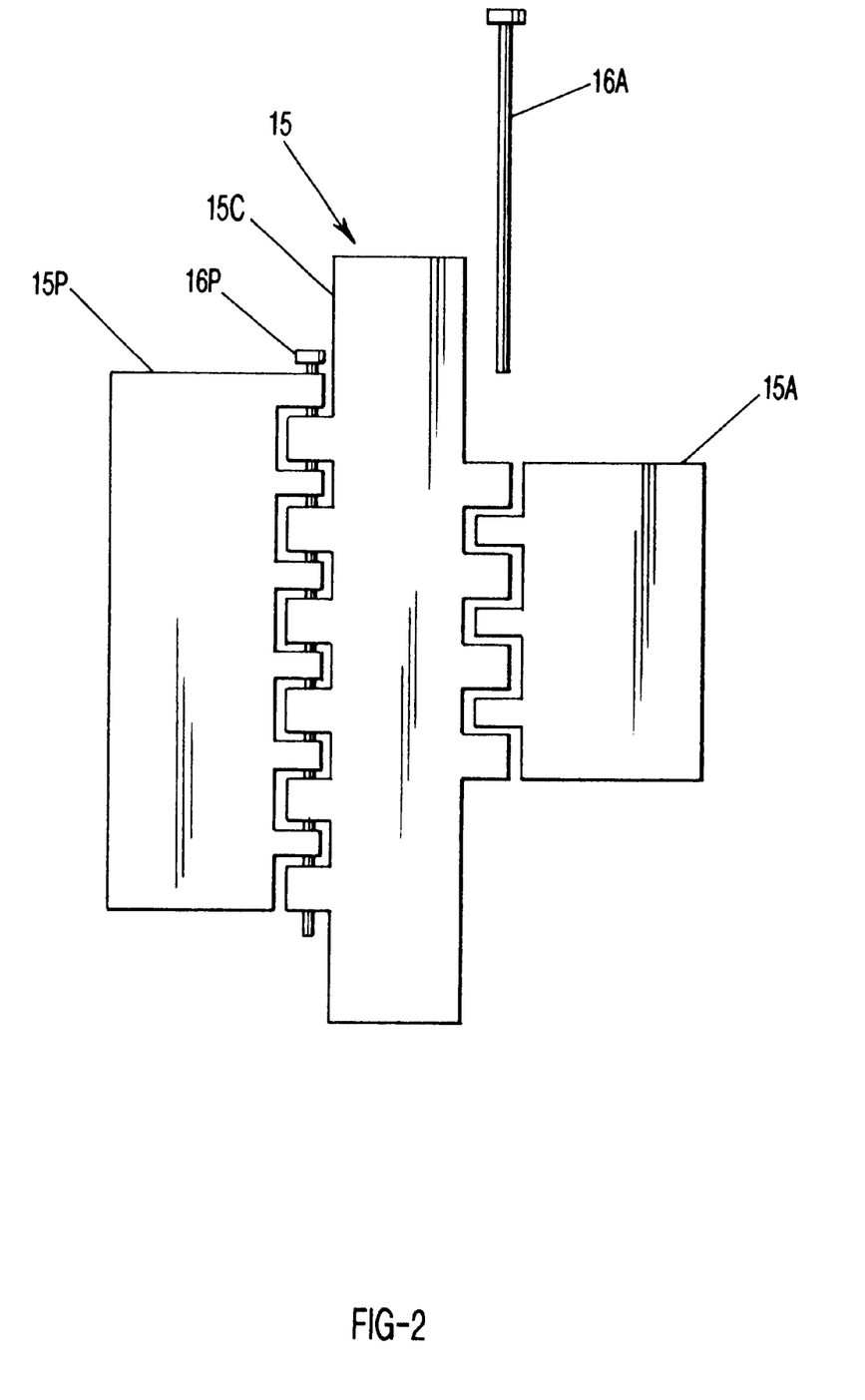
FIG. 2 is a front elevation view of the hinge device.

FIG. 2 is a top view of the members comprising hinge device 15. Hinge device, central body member 15C is fabricated from flat steel stock, approximately 8.5" in length and approximately 1.25" in width. The anterior and posterior hinge leaf members 15A and 15P, respectively, are each fabricated from flat steel stock. Anterior hinge leaf member 15A measures approximately 4" in length and 2" in width, and posterior hinge leaf member 15P measures approximately 6" in length and 2" in width. The posterior end of anterior hinge leaf member 15A is rotatably attached to the anterior end of hinge device, central body member 15C, and the anterior end of posterior hinge leaf member 15P is rotatably attached to posterior end of hinge device, central body member 15C, by joints of a common pin-and-knuckle hinge design. Elements 16A and 16P, for example, are the anterior and posterior hinge-pin members, respectively. The anterior end of anterior hinge leaf member 15A is rigidly attached, such as by rivets, to the posterior end of parking ramp member 11, and the posterior end of posterior hinge leaf member 15P is rigidly attached, such as by rivets, to the anterior end of loading ramp member 12.

Combined reference is made to FIGS. 1 and 2. Identical sleeve members 17L, 17R, 18L, and 18R are fabricated from round tubular steel stock, approximately 0.25" in diameter and 1.5" in length. Elements 19L, 19R, 20L, and 20R are identical L-shaped pin members constructed of steel rod stock approximately 0.2" in diameter and 3" in length. The short and long legs of pin members 19L, 19R, 20L, and 20R measure approximately 0.5" and 2.5", respectively. Sleeve members 17L and 17R are rigidly attached, such as by welding, to, and in parallel alignment with, the anterior end of the base of parking ramp member 11, such that they extend laterally approximately 1" beyond the sides of parking ramp member 11. The long legs of pin members 19L. and 19R are inserted through the medial ends of sleeve members 17L and 17R, respectively, and pushed laterally so that they extend into complimentary slots 21L and 21R, cut into the medial sides of base members 2L and 2R, respectively. Slots 21L and 21R measure approximately 0.25" in width and 1.5" in length, and are in parallel alignment with the long axis of base members 2L and 2R. The anterior end of parking ramp member 11 is slidably attached to base members 2L and 2R by the extension of pin members 19L and 19R laterally into slots 21L and 21R, such that the anterior end of parking ramp member 11 cannot be displaced vertically or horizontally, but is allowed to slide longitudinally in relation to the long axis of base members 2L and 2R. Sleeve members 18L and 18R are rigidly attached, such as by welding, to, and in parallel alignment with, the posterior end of loading ramp member 12, such that they extend laterally approximately 0.25" beyond the sides of loading ramp member 12. The long legs of L-shaped pin members 20L and 20R are inserted through the medial ends of sleeve members 18L and 18R, respectively, and pushed laterally, so that they extend into complimentary slots, 22L and 22R, cut into the medial sides of base members 2L and 2R, respectively. Slots 22L and 22R measure approximately 0.25" in width and 1.5" in length, and are in parallel alignment with the long axis of 2L and 2R. The posterior end of loading ramp member 12 is slidably attached to base members 2L and 2R by L-shaped pin members 20L and 20R which extend laterally through slots 22L and 22R, such that the posterior end of loading ramp member 12 cannot be displaced vertically or horizontally but, is allowed to slide longitudinally, in the relation to the long axis of base members 2L and 2R. Any suitable means is used to prevent L-shaped pin members 19L, 19R, 20L, and 20R from being displaced while motorcycle stand 1 is in use.

Figure 3:
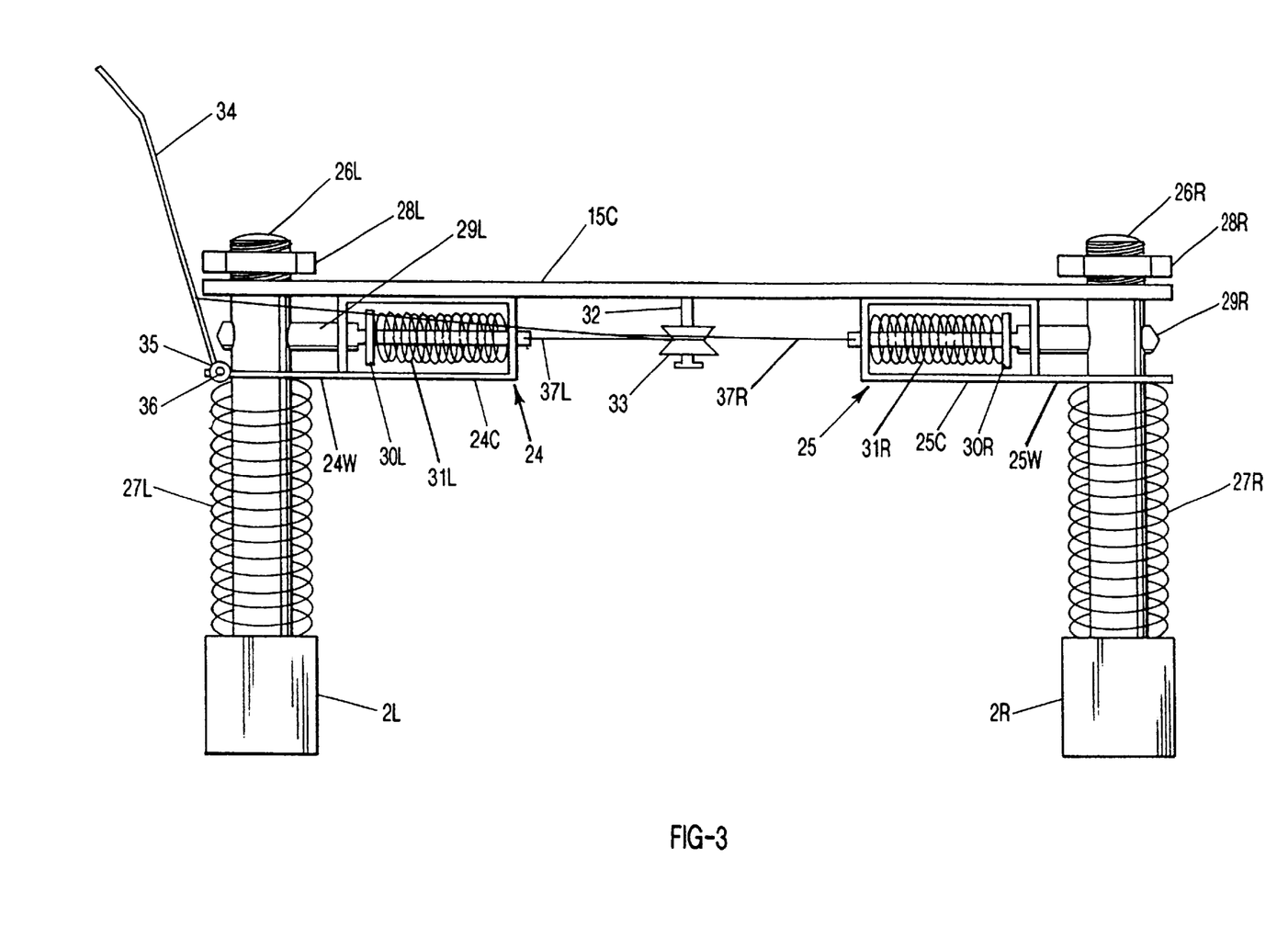
FIG. 3 is a sectional view taken along lines 23—23 of FIG. 1 showing the present invention in the parking position and the inventive means switching the present invention from the parking position to the unloading (collapsed) position.
Figure 4:
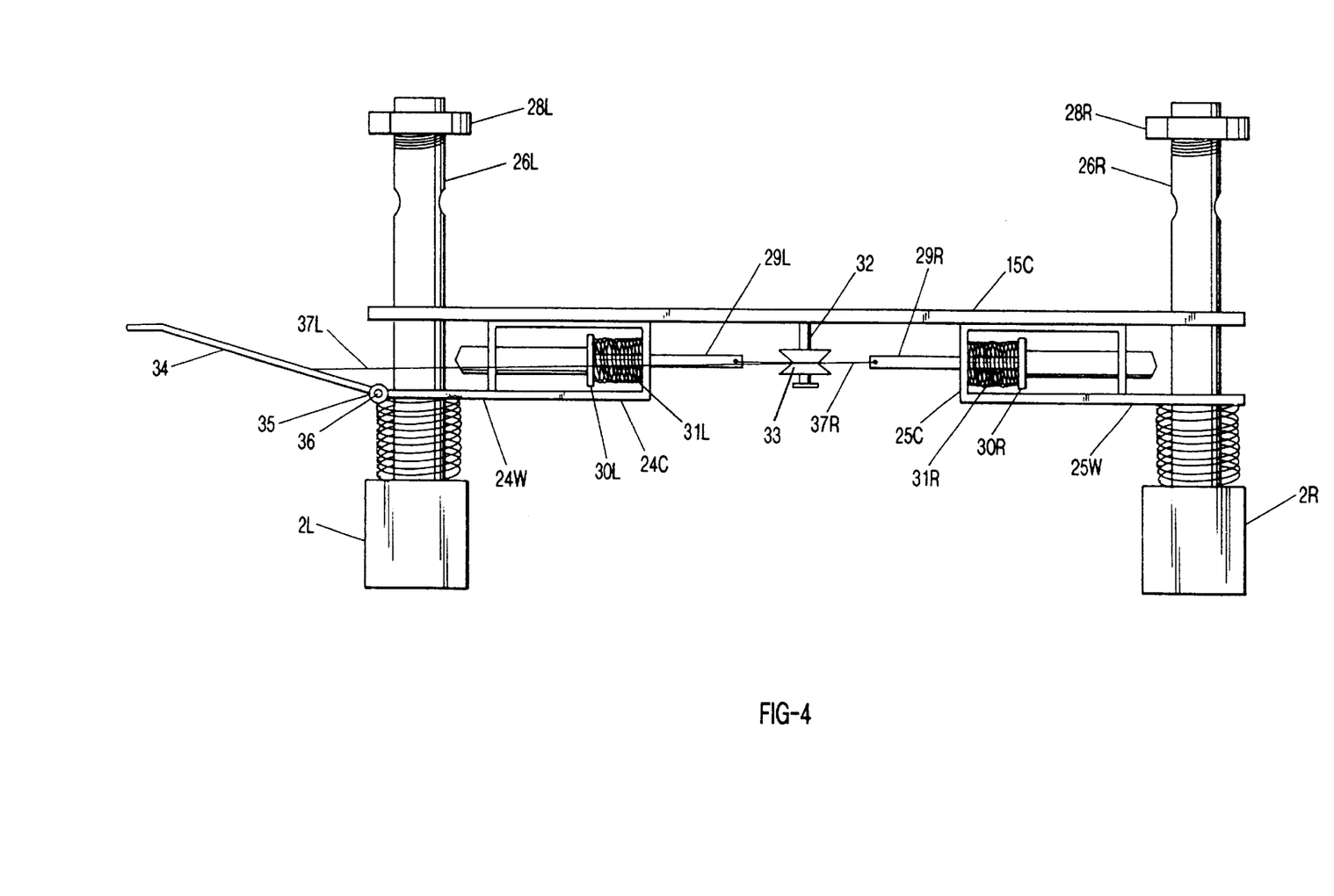
FIG. 4 is a sectional view taken along lines 23—23 of FIG. 1 showing the present invention in the unloading position and the inventive means switching the present invention from the parking position to the unloading position.
Figure 5:
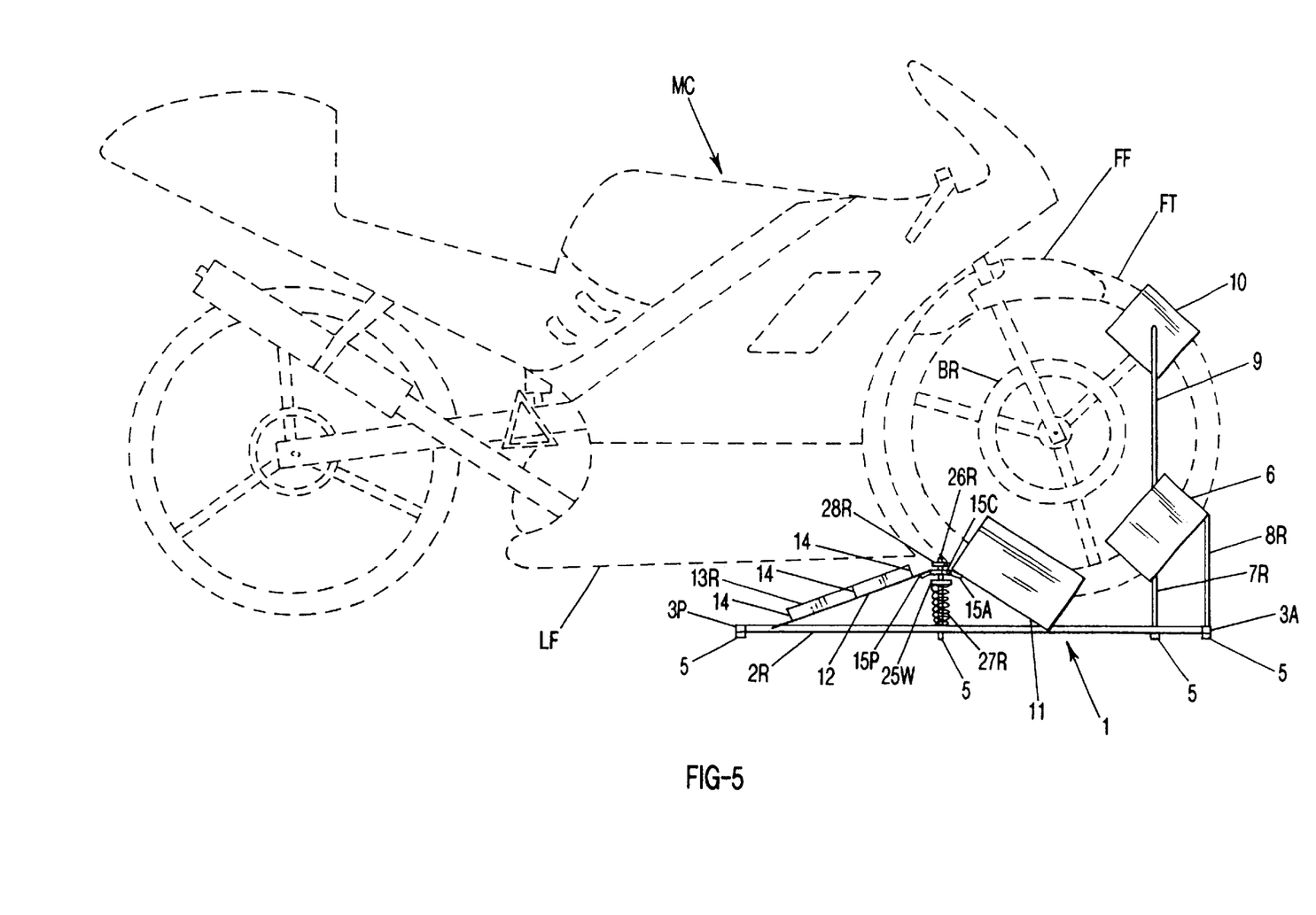
FIG. 5 is a side elevation view of an alternative embodiment of the present invention supporting the front wheel of a motorcycle, thereby maintaining the motorcycle in the parked position.

FIGS. 3 and 4 are sectional views that show the present invention in the parking (raised) and unloading (collapsed) positions, respectively. Elements 24 and 25 are a pair of identical mounting bracket members constructed of flat steel stock, while 24C and 25C are the rectangular-shaped, central body members pertaining to bracket members 24 and 25, respectively. Central body members 24C and 25C are approximately 1.5" in length, 1" in width, and 0.75" in height. A hole with a diameter of approximately 0.20" is provided in the medial side of both central body members 24C and 25C, and a hole with a diameter of approximately 0.30" is provided in the lateral side of both central body members 24C and 25C. The holes provided through the medial and lateral sides of central body members 24C and 25C are defined such that the centers of the holes are in alignment. Lateral wing members 24W and 25W are fabricated from flat steel stock, approximately 1" in width and 1.25" in length. The medial ends of lateral wing members 24W and 25W are rigidly attached, such as by welding, to the lateral ends of mounting bracket members 24 and 25, respectively. Mounting bracket members 24 and 25 are rigidly attached, such as by rivets, to the inferior surface of hinge device central body member 15C. Holes with a diameter of approximately 0.6" are provided near each end of hinge device central body member 15C such that they are aligned with corresponding holes, also approximately 0.6" in diameter, provided near the lateral ends of lateral wing members 24W and 25W. A pair of identical hinge device, support rod members 26L and 26R are fabricated from steel rod stock approximately 0.5" in diameter and 3.5" in length, that are rigidly attached, such as by welding, to, and in perpendicular alignment with, base members 2L and 2R, respectively. Hinge device, support rod members 26L and 26R are attached approximately 20" from lateral support member 3A as suggested in FIG. 1. A pair of identical steel, ramp-raising springs 27L and 27R with a diameter of approximately 0.7" and approximately 3" in length are positioned over hinge device support rod members 26L and 26R, respectively. As is also shown in FIG. 1, the hinge device central body member 15C is positioned such that hinge device support rod members 26L and 26R pass through the complimentary pair of aligned holes in hinge device central body member 15C and lateral wing member 24W, and in hinge device central body member 15C and lateral wing member 25W, respectively. The force exerted by ramp-raising springs 27L and 27R tends to raise hinge device 15. A pair of identical nuts 28L and 28R screw onto the threaded ends of 26L and 26R, respectively. Central body member 15C can be raised and lowered along the long axis of hinge device support rod members 26L and 26R, but cannot be vertically displaced from hinge device support rod members 26L and 26R when ramp raising springs 27L and 27R are in place. A pair of lock pin members 29L and 29R are fabricated from steel rod stock approximately 2.7" in length. The medial segments of lock pin members 29L and 29R measure approximately 1.3" in length and 0.125" in diameter. The lateral segments of lock pin members 29L and 29R measure approximately 1.4" in length and 0.25" in diameter. Elements 30L and 30R are an identical pair of steel washers having an outer diameter of approximately 0.6" and a central aperture with a diameter of approximately 0.3", while 31L and 31R are a pair of identical steel, pin-locking springs with a diameter of approximately 0.5" and approximately 1.5" in length. The medial ends of lock pin members 29L and 29R are inserted through the lateral holes in central body members 24C and 25C, respectively. Washers 30L and 30R are placed over the medial ends of 29L and 29R, respectively. Pin locking springs 31L and 31R are placed over the medial ends of lock-pin members 29L and 29R, respectively. Lock-pin members 29L and 29R are inserted through the respective holes in the medial ends of central body members 24C and 25C. The force exerted by springs 31L and 31R tends to push pin members 29L and 29R laterally outward. A hole with a diameter of approximately 0.35" is provided near the superior end of both hinge device support rod members 26L and 26R. Hinge device 15 is raised by the force exerted by ramp-raising springs 27L and 27R until the holes in hinge device support rod members 26L and 26R become aligned with lock-pin members 29L and 29R, and lock-pin members 29L and 29R are then pushed laterally, by pin locking springs 31L and 31R, through the complimentary holes in hinge device support rod members 26L and 26R, thereby locking hinge device 15 into the parking position. The holes in hinge device support rod members 26L and 26R are positioned such that the superior surface of hinge device 15 is positioned approximately 4" above the superior surface of base members 2L and 2R when hinge device 15 is in the parking position. When hinge device 15 is in the parking position, parking ramp member 11 preferably is at an angle of approximately 30° in respect to the long axis of base members 2L and 2R, and loading ramp member 12 preferably is at an angle of approximately 20° with respect to the long axis of base members 2L and 2R. A pulley-post member 32 is fabricated from steel rod stock approximately 0.125" in diameter and 0.7" in length. A pulley wheel 33 has an outer diameter of approximately 0.5", a width of approximately 0.5", and a central aperture with a diameter of approximately 0.2". The superior end of pulley-post member 32 pierces through the central aperture of pulley wheel member 33 and is then rigidly attached, such as by welding, to the inferior surface of hinge device central body member 15C. The enlarged head fabricated into the inferior end of pulley post member 32 prevents pulley wheel member 33 from being displaced from pulley post member 32. A lever member 34 is fabricated from steel rod stock approximately 0.25" in diameter and 2.5" in length. A steel sleeve member 35, approximately 0.3" in diameter and 0.5" in length, is rigidly attached, such as by welding, to, and in perpendicular alignment with, the inferior end of lever member 34. The lever attachment member 36 is fabricated from steel rod stock approximately 0.25" in diameter and 0.75" in length. Lever attachment member 36 is rigidly attached, such as by welding, to the posterior side, and near the lateral end, of lateral wing member 24W. Lever member 34 is rotatably attached to lateral wing member 24W when steel sleeve member 35 is slid into position over lever attachment member 36. Any suitable means is used to prevent steel sleeve member 35 from being displaced from lever attachment member 36. Elements 37L and 37R are individual lengths of wire cable. One end of wire cable 37L is attached to the medial end of lock-pin member 29L, and the other end of wire cable 37L is attached to lever member 34. Wire cable 37L is strung such that it passes over the anterior side of pulley wheel member 33 and then wraps around to the posterior side of pulley wheel member 33. One end of wire cable 37R is attached to the medial end of lock-pin member 29R and the other end of wire cable 37R is attached to lever member 34. Wire cable 37R is strung such that it passes over the posterior surface of pulley wheel member 33. Wire cables 37L and 37R are sized such that lock-pin members 29L and 29R are simultaneously pulled medially approximately 0.75" when lever member 34 is rotated, counter clockwise, through an arc, of for example approximately 75 degrees. The compressed length of pin-locking springs 31L and 31R prevent the lateral ends of lock-pin members 29L and 29R, respectively, from being pulled far enough medially to be displaced from the holes in the lateral ends of 24C and 25C. The attachment of wire cables 37L and 37R to the medial ends of lock-pin members 29L and 29R, respectively, prevent the medial ends of lock-pin members 29L and 29R from being displaced from the holes in the medial ends of central body members 24C and 25C. When pulled medially approximately 0.75", lock pin members 29L and 29R become disengaged from hinge device support rod members 26L and 26R, respectively, allowing hinge device 15 to collapse to the unloading position when a downward force, that is sufficient to overcome the resistance created by ramp-raising springs 27L and 27R, is applied to hinge device 15. When hinge device 15 is in the unloading position, parking ramp member 11 preferably is at an angle of approximately 11° with respect to the long axis of base members 2L and 2R, and loading ramp member 12 preferably is at and angle of approximately 7° in respect to the long axis of base members 2L and 2R FIG. 5 shows motorcycle stand 1 securely supporting a roadrace motorcycle MC in an upright, parked position. The front tire FT is engaged by lower anterior wheel stop member 6, upper anterior wheel support member 10, and parking ramp member 11 such that motorcycle MC cannot be moved in the forward, backward, or lateral directions. Motorcycle stand 1 is sized and configured such that it does not interfere with the motorcycle's MC's front fender FF, brake rotor BR, and lower fairing LF. To unload the motorcycle MC from motorcycle stand 1, the rider stands at the side of the motorcycle MC and stabilizes the motorcycle MC, and then using a foot, presses lever member 34 downward until 29L and 29R become disengaged, allowing the weight of the motorcycle MC to force hinge device 15 downward to the unloading position. The rider then simply rolls the motorcycle MC backward and away from motorcycle stand 1. When the motorcycle MC is removed from motorcycle stand 1, ramp raising springs 27L and 27R push hinge device 15 upward until lock-pin members 29L and 29R are automatically forced into the complimentary holes in hinge device support rod members 26L and 26R, by the force exerted by pin-locking springs 31L and 31R, thereby, locking hinge device 15 into the parking position and motorcycle stand 1 can be re-used to park another motorcycle MC.

In another embodiments of the present invention, components are fabricated from lower density materials (e.g., aluminum, plastic), rather than from steel stock, to decrease the total weight of the present invention. Lever member 34 may be relocated, closer to the posterior end of loading ramp member 12, to enable the rider to more easily operate lever member 34 while seated on the MC, and a means could be used to prevent lever member 34 from being accidentally pushed downward. Also, any suitable means could be used to ensure wire cables 37L and 37R are maintained in position around pulley wheel member 33. Additionally, wheel support rod members 9L and 9R could be adjustably, rather than rigidly, attached to wheel stop member 6, thereby allowing wheel support member 10 to be adjusted forward and backward to optimally fit wheels of different diameters, and also allowing wheel support member 10 to be folded down to make the present invention more compact during transport and storage. Wheel support, rod members 9L and 9R could also be fabricated such that their lengths are adjustable, thereby allowing wheel support member 10 to be adjusted vertically to optimally fit wheels of different diameters. In addition, lateral support members 3A and 3P could be fabricated such that they can be folded to the sides of base members 2L and 2R to make the present invention more compact during transport and storage. Also, an alternate means could be used to slidably attach the posterior end of loading ramp member 12 and the anterior end of parking ramp member 11, respectively, to base members 2L and 2R. Continuing, an alternate means could be used to lock hinge device central body member 15C in, and unlock hinge device, central body member 15C from the parking position. In addition, an alternate means could be used to raise hinge device, central body member 15C to the parking position. Furthermore, wheel stop member 6 and parking ramp member 11 could be dimensioned along their length and width to increase the surface area in contact with the wheel, thereby optimizing the stability of the parked motorcycle. Penultimately, base members 2L and 2R could be fabricated such that their lengths are adjustable, at points located between cross support member 4 and slots 21L and 21R, thereby allowing motorcycle stand 1 to be optimally fit to securely hold wheels of different 10 diameters, and also allowing the present invention to be made more compact for transport and storage. Lastly, motorcycle stand 1 could be configured to park a motorcycle MC by securing the rear wheel of the motorcycle MC.

Figure 6:
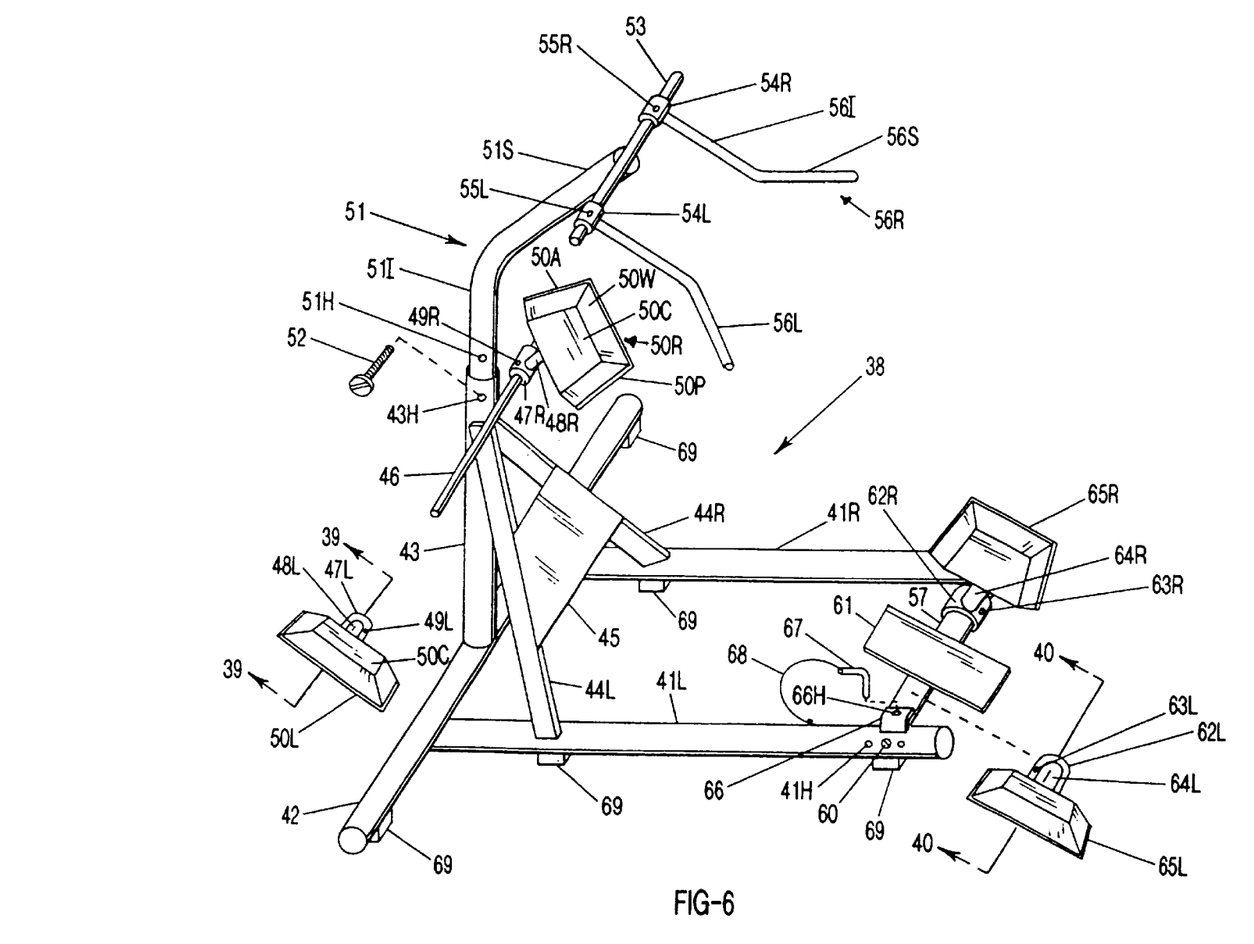
FIG. 6 is a perspective view of the preferred embodiment of the present invention.

A preferred embodiment of the inventive motorcycle stand 38 is shown in FIG. 6. Motorcycle stand 38 is sized and configured so it can be used to park a wide variety two-wheel vehicle designs. A pair of identical, spaced-apart (approximately 6.5"), parallel, base members 41L and 41R are fabricated from 1.25" round tubular steel stock, approximately 19" in length and having anterior and posterior ends. A plurality of paired holes 41H are near the posterior ends of base members 41L and 41R. The lateral support member 42 also is fabricated from 1.25" round tubular steel stock, approximately 20" in length. Lateral support member 42 is rigidly attached, such as by welding, to the anterior end of base members 41L and 41R, respectively. A vertical support member 43 is fabricated from 1.25" by 0.125" round tubular steel stock, approximately 10.5" in length, and has superior and inferior ends. A threaded hole 43H is located approximately 1" from the superior end of vertical support member 43. Angled support members 44L and 44R are fabricated from 3⁄16" by 1" flat steel stock, approximately 10.5" in length, and having anterior and posterior ends. The anterior ends of angled support members 44L and 44R are rigidly attached, such as by welding, to vertical support member 43 approximately 9.25" from the inferior end of vertical support member 43. The posterior ends of 44L and 44R are rigidly attached, such as by welding, to base members 41L and 41R, respectively, approximately 4.5" from the anterior ends of base members 41L and 41R. Angled support members 44L and 44R are attached such that the longitudinal axes of angled support members 44L and 44R are preferably at an angle of approximately 60° with respect to the longitudinal axes of base members 41L and 41R. Lower anterior wheel stop member 45, having anterior and posterior ends, is A-shaped with the anterior and posterior ends being approximately 4.5" and 6" in length, respectively. Lower anterior wheel stop member 45 is rigidly attached, such as by welding, to angled support members 44L and 44R such that that posterior end of lower anterior wheel stop member 45 is approximately 4" from the posterior ends of angled support members 44L and 44R.

Medial horizontal slide rod member 46, fabricated from 0.375" round tubular steel stock and approximately 7" in length, is rigidly attached, such as by welding, to vertical support member 43 such that the longitudinal axis of medial slide rod member 46 is parallel to the longitudinal axis of lateral support member 42. Slide rod member 46 is attached approximately 9.5" from the inferior end of vertical support member 43. 47L and 47R represent a pair of identical, medial sleeve members fabricated from 0.625" by 0.120" round tubular steel stock, approximately 0.75" in length. The inferior ends of support rod members 48L and 48R are rigidly attached, such as by welding, to sleeve members 47L and 47R, respectively, such that the longitudinal axes of support rod members 48L and 48R are at a preferable angle of approximately 65° with represent to the longitudinal axes of sleeve members 47L and 47R.

A pair of identical, anterior wheel support members 50L and 50R, fabricated from 0.0625" flat steel stock approximately 5" in length and 3.25" in height, each have a central portion 50C, an upper wing 50W, an anterior wing 50A, and a posterior wing 50P. The central body 50C is flat and is approximately 3" in length and 2.25" in height. The upper wing 50W is approximately 1" in height and 5" in length. Anterior wing 50A and posterior wing 50P are approximately 2.25" in height and 1" in length, respectively. Upper wing 50W, anterior wing 50A and posterior wing 50P are each bent at an angle of approximately 45° with respect to the plane of central body 50C and function as guides that direct the front tire FT of the motorcycle MC into proper position. Medial anterior wheel support members 50L and 50R are rigidly attached, such as by welding, to the superior ends of support rod members 48L and 48R, respectively, such that the longitudinal axes of medial anterior wheel stop members 50L and 50R are perpendicular to the longitudinal axes of sleeve members 47L and 47R, respectively.

Figure 7:
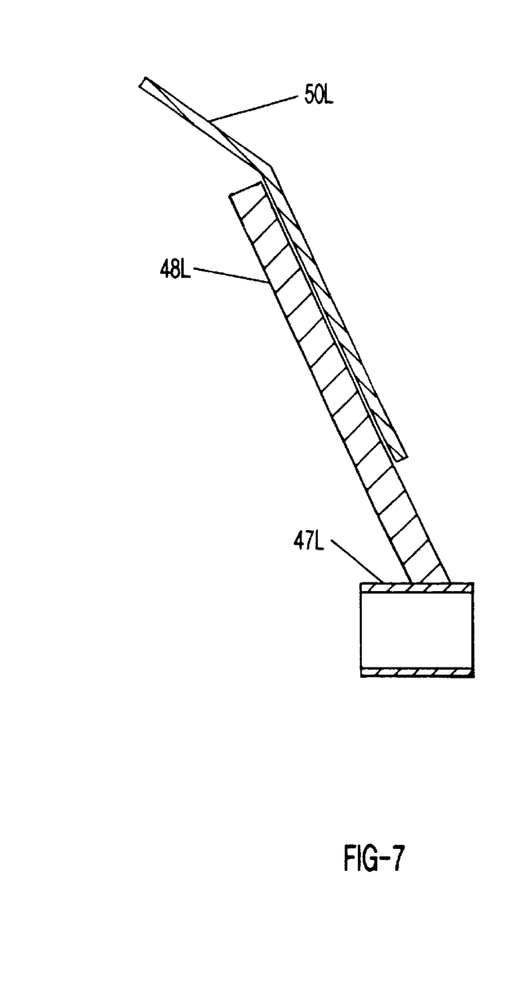
FIG. 7 is a sectional view taken along lines 39—39 of FIG. 6 detailing how the anterior wheel supports, support rod members, and sleeve members are joined.

FIG. 7 details how the medial anterior wheel supports 50l, support rod members 48l, and sleeve members 47l are joined. Description of the left-side medial anterior wheel support 50L seen in FIG. 7 serves to described the right-side medial anterior wheel support 50R, seen in FIG. 1, as well. Sleeve members 47L and 47R fit over slide rod member 46 and can be telescoped over, and rotated around, the longitudinal axis of medial slide rod member 46. Set screw type fasteners 49L and 49R are threadably secured within sleeve members 47L and 47R, respectively, and adjustably attach sleeve members 47L and 47R to slide rod member 46. Medial anterior wheel stop members 50L and 50R can be adjusted to securely engage front wheels FT of different widths and diameters by loosening set screws 49L and 49R, moving medial anterior wheel stop members 50L and 50R along and around the longitudinal axis of slide rod member 46 to the desired position, and then tightening set screws 49L and 49R to lock anterior wheel stop members 50L and 50R into place.

The support arm member 51 is fabricated from 1" round tubular steel stock approximately 20" in length and has an inferior portion 51I and a superior portion 51S. Inferior portion 51I and superior portion 51S are approximately 14" and 6" in length, respectively. Support arm member 51 is bent such that the longitudinal axis of inferior portion 51I is at an angle of approximately 55° with respect to the longitudinal axis of superior portion 51S. 51H represents a multitude of threaded holes in the inferior portion 51I of support post member 51. Inferior portion 51I fits snugly inside of and telescopes within vertical support member 43, so that the support member is slidably movable within the vertical support member. By this mode of connection, the support arm member is selectively positionable at a plurality of distances above the base, so that the upper anterior wheel support members 56L and 56R also may be raised and lowered to accommodate wheels of different diameters. A screw type fastener 52 is threadably secured through threaded holes 43H and 51H to prevent support arm member 51 from being raised, lowered, and rotated. Support arm 51 can be raised and lowered to accommodate front wheels FT of different diameters. Upper slide rod member 53 is fabricated from 0.375" round tubular steel stock and approximately 7.5" in length. Upper slide rod member 53 is rigidly attached, such as by welding, to the superior end of support arm member 51 such that the longitudinal axis of slide rod member 53 is perpendicular to the longitudinal axis of support arm member 51. 54L and 54R represent a pair of identical, sleeve members fabricated from 0.6251" by 0.120" round tubular steel stock, approximately 0.75" in length. A pair of identical, upper anterior wheel support members 56L and 56R are fabricated from 0.375" by 0.095" round tubular steel stock, each one approximately 7.5" in length and having a superior portion 56S and an inferior portion 56I as seen in FIG. 6. Superior portion 56S and inferior portion 56I are approximately 4.5" and 3" in length, respectively. Upper anterior wheel support members 56L and 56R are bent (flared out) such that the longitudinal axis of superior portion 56S is at an angle of approximately 45° with respect to the longitudinal axis of inferior portion 56I. The flared-out inferior portions 56I guide the front wheel FT into the parking position as the motorcycle MC is rolled onto the motorcycle stand 38. Superior portions 56S engage the front wheel FT when the MC is in the parking position. Upper anterior wheel support members 56L and 56R are rigidly attached, such as by welding, to sleeve members 54L and 54R, respectively, such that the longitudinal axes of superior portion 56S is perpendicular to the longitudinal axes of sleeve members 54L and 54R. Set screw type fasteners 55L and 55R are threadably secured within sleeve members 54L and 54R, respectively, and adjustably attach sleeve members 54L and 54R to upper slide rod member 53. Upper wheel stop members 56L and 56R are thus selectively positionable along slide rod member 53 to accommodate and to engage front wheels FT of different widths and diameters. By loosening set screws 55L and 55R, moving upper anterior wheel stop members 56L and 56R along and around the longitudinal axis of slide rod member 53 to the desired position, and then tightening set screws 55L and 55R to lock upper wheel stop members 56L and 56R in place, the position of the upper anterior support members can be optimized and customized to a particular wheel size.

Figure 8:
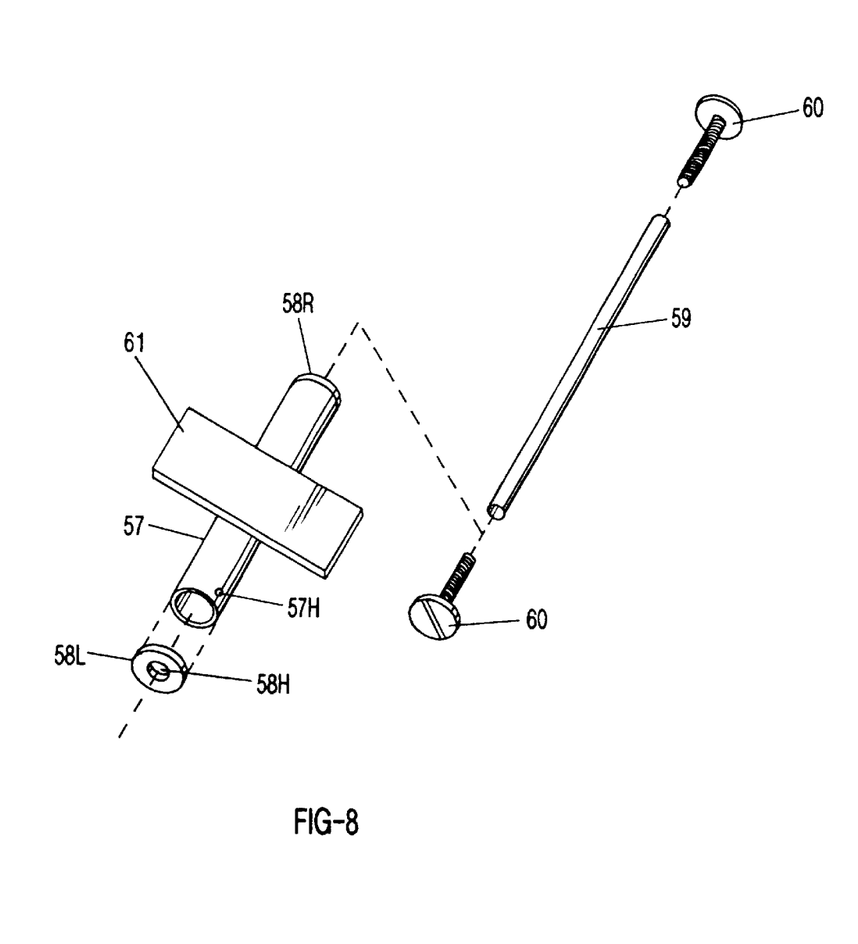
FIG. 8 is a perspective view showing the inventive ramp device.

Referring now to FIG. 8, 57 represents the barrel member fabricated from 1" round tubular steel stock approximately 6.1875" in length and having left and right ends. Element 57H is a hole approximately 0.125" from the left end of barrel member 57. Washer members 58L and 58R are each fabricated from steel stock and have an outside diameter of 1" and a centrally located hole 58H approximately 0.4375" in diameter. Washer members 58L and 58R are rigidly attached, such as by welding, to the left and right ends, respectively, of barrel member 57 such that holes 58H are in alignment. Rod member 59 is disposed through the holes in the washers 58L and 58R so as to be concentrically disposed within the barrel member 57. The barrel member thus is rotatable upon the rod member 59. Both ends of rod member 59, fabricated from 0.4375" round tubular steel stock, are threaded to receive screws 60, the screws 60 being a means for removably fastening the rod member to the base members 41L and 41R. The planar parking ramp member 61 preferably is fabricated from 0.125" by 2" flat steel stock approximately 5.25" in length and having anterior and posterior ends. Parking ramp member 61 is rigidly attached, such as by welding, tangentially to the cylinder of the barrel member 57 such that ramp member 61 is centered over the longitudinal axis of barrel member 57. The screws 60 are a means for removably fastening the ends of the rod member 59 to the base of the invention. By means of the rod member 59 and screws 60, which screws are selectively disposable into selected pairs of a plurality of pairs of opposing, aligned, holes 41H defined in respective ones of the base members 41L and 41R, the parking ramp member 61 is selectively movably disposed on the base, its horizontal position (and the position of the barrel member 57) thus adjustable to accommodate wheels of different diameters.

Parking ramp 61 thus serves as both a loading and unloading ramp, being as it is rotationally attached to the base near the posterior (i.e., open) end of the base. The parking ramp moves (rotates) between the loaded and unloaded position by contact with the front (or alternatively, rear) wheel which, after it rolls up the inclined parking ramp and passes over the ramp's fulcrum, pushes (by the weight of the vehicle) the forward end of the ramp downward, allowing gravity to pull the motorcycle down the declined ramp. The longitudinal axis of the ramp is at an angle of approximately 25° with respect to the plane of the supportive surface when the parking ramp is in the loaded and unloaded positions. When locked in the loaded position (as described below) the parking ramp prevents the parked motorcycle from rolling backward and out of engagement with the motorcycle stand.

Figure 9:
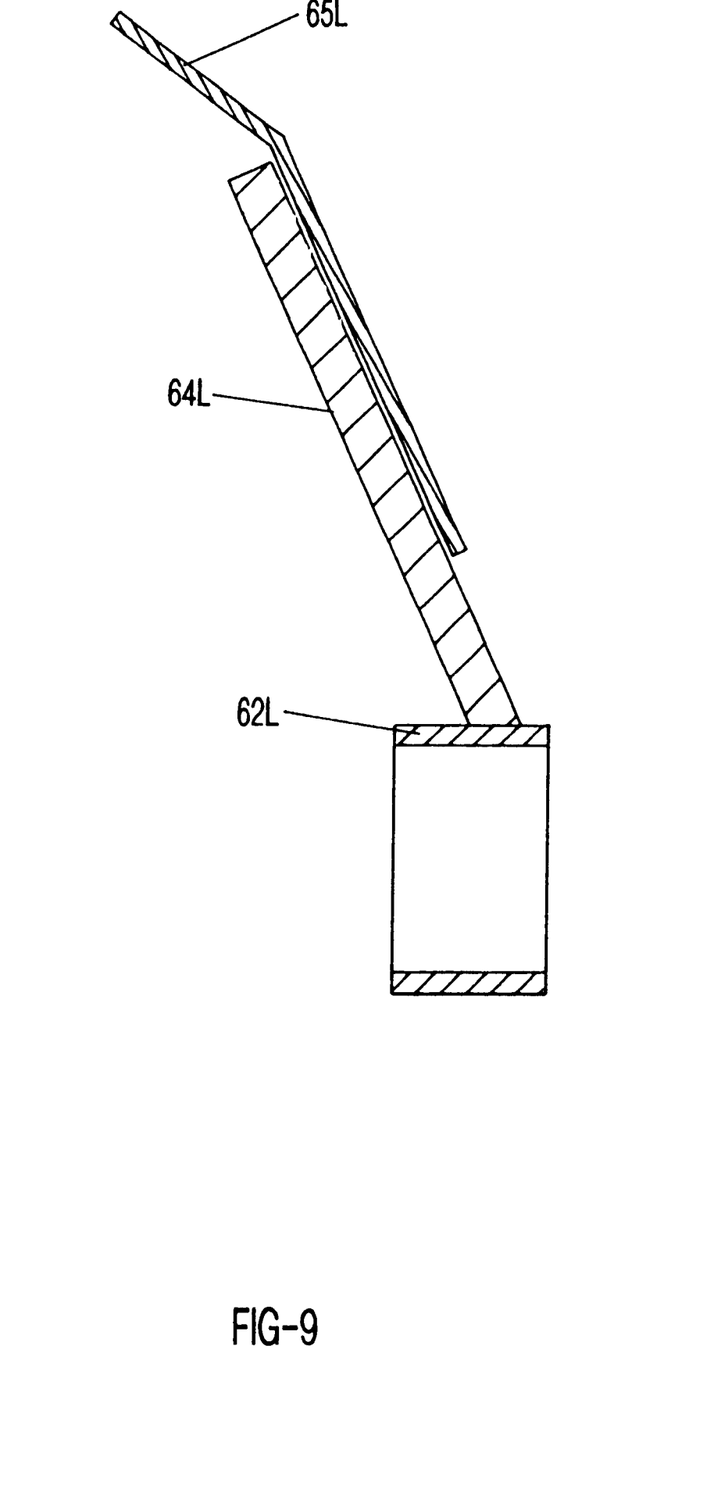
FIG. 9 is a sectional view taken along lines 40—40 of FIG. 6 detailing how the posterior wheel supports, support rod members, and sleeve members are joined.

A pair of identical sleeve members 62L and 62R is fabricated from 1.25" by 0.120" round tubular steel stock, approximately 0.75" in length. A description of the left sleeve member 62L, left support rod member 64L, and left wheel support member 65L, as depicted in FIG. 9, serves to describe the right support rod member 64R and associated right sleeve 62R and right wheel support member 65R, as they are mirror images of each other as suggested in FIG. 6. A pair of identical support rod members 64L and 64R, fabricated from 0.375" by 0.095" round tubular steel stock, are approximately 3" in length and having superior and inferior ends. The inferior ends of support rod members 64L and 64R are rigidly attached, such as by welding, to sleeve members 62L and 62R, respectively, such that the longitudinal axes of support rod members 64L and 64R are at an angle of approximately 65° with respect to the longitudinal axes of sleeve members 62L and 62R. Sleeve members 62L and 62R fit over barrel member 57 and can be telescoped over, and rotated around, the longitudinal axis of barrel member 57. Set screws type fasteners 63L and 63R are threadably secured within sleeve members 62L and 62R, respectively, and adjustably attach sleeve members 62L and 62R to barrel member 57. Identical, lower posterior wheel support members 65L and 65R are mostly identical to medial anterior wheel support members 50L and 50R. Lower posterior wheel support members 65L and 65R are rigidly attached, such as by welding, to the superior ends of support rod members 64L and 64R, respectively, such that the longitudinal axes of lower posterior wheel support members 65L and 65R are perpendicular to the longitudinal axes of sleeve members 62L and 62R, respectively. Sleeve members 62L and 62R are rotatably disposed around the barrel member and can slide axially along the barrel member. Tightening set screws 63 can prevent rotation and translation of the sleeve embers 62L and 62R. FIG. 9 details how the posterior wheel supports 65, support rod members 64, and sleeve members 62 are joined.

Lower posterior wheel support members 65L and 65R thus are selectively positionable along the barrel member 57 to accommodate and securely engage front wheels FT of different widths and diameters by loosening set screws 63L and 63R, moving posterior wheel support members 65L and 65R along and around the longitudinal axis of barrel member 57 to the desired position, and then tightening set screws 63L and 63R to lock lower posterior wheel support members 65L and 65R in place. Barrel member 57 is rotatably fixed in position by rod member 59 which passes through aligned holes 41H and 58H. Rod member 59 is removably attached to bases members 41L and 41R by screws 60. Ramp member 57 rotates as barrel member 57 rotates over rod member 59. Ramp member 57 serves as a loading ramp when the posterior end of ramp member 57 rests against the supportive surface SS and ramp member 57 serves as an unloading ramp when the anterior end of ramp member 57 rests against the supportive surface SS. Locking bracket member 66 is fabricated from 1" flat steel stock approximately 1.25" in length and having superior and inferior ends. Bracket member 66 is bent at a 90° angle approximately 0.25" from its inferior end. A hole 66H is located approximately 0.125" from the superior end of bracket member 66. The inferior end of bracket member 66 is rigidly attached, such as by welding, to base member 41L. Lock pin member 67 is fabricated from 0.1875 round tubular steel stock approximately 1.75" in length and having superior and inferior ends. Lock-pin member 67 is bent at a 90° angle approximately 1" from its inferior end. Hole 57H seen in FIG. 8 is positioned such that it is in alignment with hole 66H when the anterior end of parking ramp member 61 rests on, or near, the supportive surface SS, that is, when the parking ramp 61 is in the loaded position. Lock-pin member 67, when inserted through both the holes 66H and 57H, serves to prevent the rotation of barrel member 57 with respect to the base of the invention. A segment of steel cable 68 attaches lock-pin member 67 to base member 41L. One end of cable 68 is attached to base member 41L and the other end of cable 68 is attached to lock-pin member 67. A plurality of rubber anti-skip members 69 are rigidly attached to base members 41L and 41R and lateral-support member 42 to prevent motorcycle stand 38 from moving as the motorcycle MC is loaded into, and unloaded from, the motorcycle stand 38.

Figure 10:
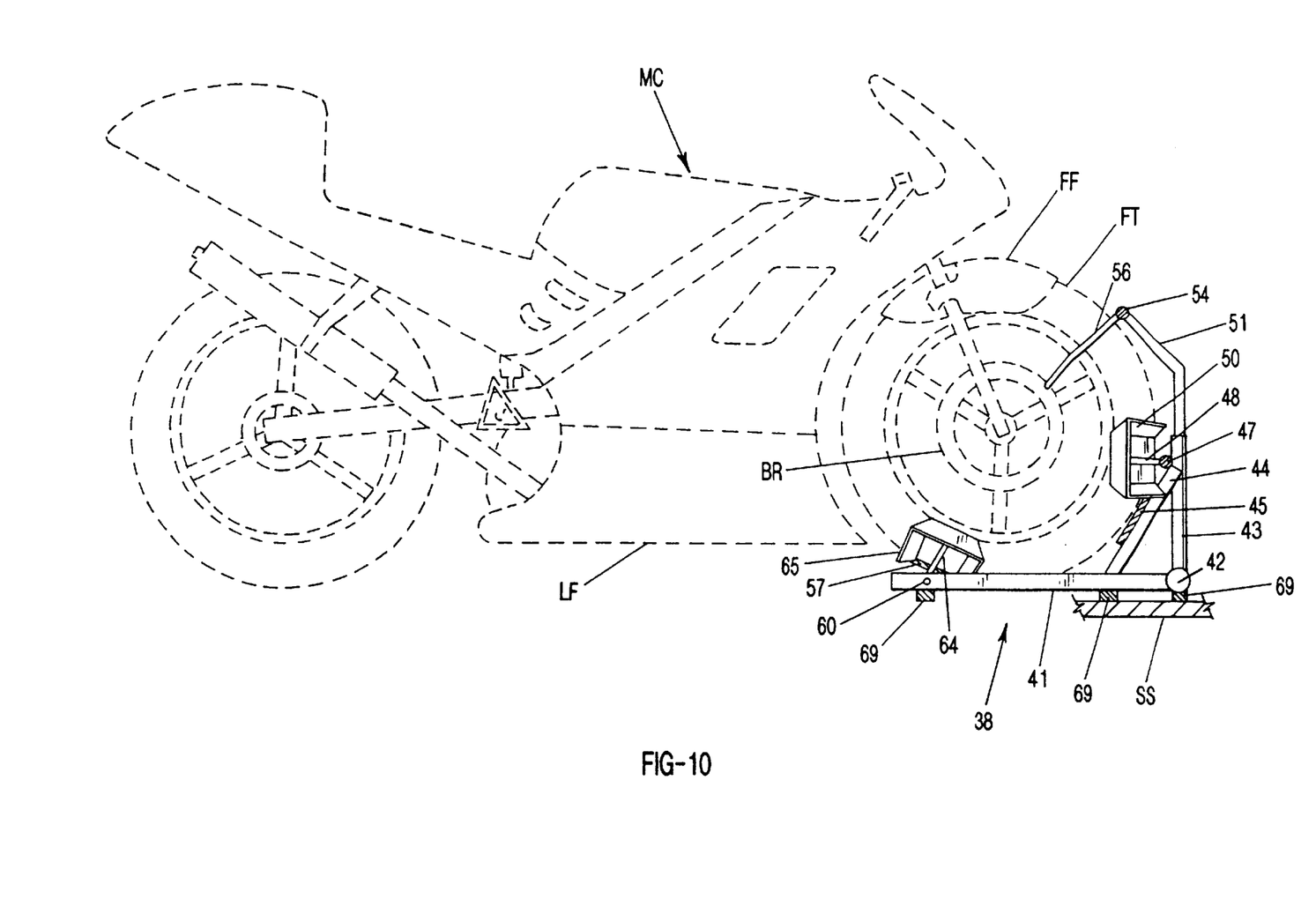
FIG. 10 is a side elevation view of the preferred embodiment of the present invention supporting the front wheel of a motorcycle, thereby maintaining the motorcycle in a secured upright parked position.

FIG. 10 shows motorcycle stand 38 positioned on a supportive surface SS and securely supporting a roadrace motorcycle MC in an upright, parked position. The front wheel FT is engaged, at an anterior portion thereof below the height of the axle, by lower anterior wheel stop member 45, parking ramp member 61, medial anterior wheel support members 50L and 50R, lower posterior wheel support members 65L and 65R, and upper anterior wheel support members 56L and 56R such that motorcycle MC cannot be moved in the forward, backward, or lateral directions. Motorcycle stand 38 is sized and configured such that it does not interfere with the motorcycle's MC's front fender FF, brake rotor BR, and lower fairing LF.

Potential modifications to the preferred embodiment of the present invention include: fabricating components from lower density materials (e.g., aluminum, composite resins); fabricating components from different sized and shaped (e.g., square, hexagonal) stock rather than from round stock; fabricating the wheel stop member 45 and ramp member 61 from diamond plate material to minimize tire slippage; adjustably attaching lower anterior wheel stop member 45 accommodate different sized wheels; modifying the length of the parking ramp member 61 to change the steepness at which ramp member 61 is inclined; utilizing additional set screws 49, 55, and 63, or an alternate means adjustably attach wheel supports 50, 56, and 65; modifying the location and number of wheel supports 50, 56, and 65; fabricating the wheel supports 50, 56, and 65 to incorporate lengthened wheel guides that guide the wheel into place as the motorcycle MC is loaded into the motorcycle stand 38; fabricating the upper wheel supports 56 so that they can be adjusted along the longitudinal axis of the support arm member 51; and incorporating a means (e.g., spring) that automatically keeps parking ramp member 61 in the loading position when a motorcycle MC is not loaded into the motorcycle stand 38. Also, base members 41L and 41R and lateral support member 42 could be made to telescope so the present invention could be made more compact during transport and storage. Penultimately, the present invention could be modified to park other types of motorcycles (e.g., off-road) and two-wheeled vehicles (e.g., bicycles). Finally, the present invention could be modified to engage the rear wheel of the two-wheeled vehicle.

The objectives of the present invention are met because one person can safely and securely park a motorcycle without having to dismount the motorcycle, without the aid of another individual, and without having to use a hand or foot to push a lever to raise the motorcycle to the parked position. The present invention requires no hands to operate and is noncomplex, lightweight, easy to operate and transport, and of inexpensive construction. The present invention can also be used to securely park a wide variety of two-wheeled vehicles.

The foregoing description of the preferred embodiment of the invention has been presented for the purposes of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto.

What is claimed is:

1. A stand apparatus for securing a two-wheeled vehicle in an upright, parked position, the vehicle having wheels to roll the vehicle across a supporting surface and on and off the stand apparatus, said apparatus comprising:
   a base disposable upon the supporting surface;
   at least one lower anterior wheel stop member positioned above said base;
   at least one upper anterior wheel support member positioned above said base; and
   a parking ramp member movably disposed upon said base and movable between an unloaded position and a loaded position;
   a horizontal cylindrical barrel member movably mounted upon and rotatable with respect to said base, wherein said ramp member comprises a planar ramp member rigidly attached tangentially to said barrel member, said ramp member rotatable with said barrel member between the unloaded position and the loaded position;
   at least one lower posterior wheel support member movably connected to said barrel member;
   at least one sleeve member movably disposed upon said barrel member;
   means for releasably securing said sleeve against movement in relation to said barrel member; and
   a support rod member rigidly extending between said at least one sleeve member and said lower posterior wheel support;
   wherein said sleeve member is selectively positionable along said barrel member, and wherein said lower anterior wheel stop member is below said upper anterior wheel support member and above said parking ramp member when the vehicle is secured in the parked position.

2. An apparatus according to claim 1 further comprising:
   a rod member concentrically disposed within said barrel member, said barrel member rotatable upon said rod member;
   a plurality of pairs of aligned holes defined in said base; and
   means for removably fastening ends of said rod member to said base, said means disposable through selected ones of said pairs of aligned holes defined in said base;
   wherein said rod member is selectively movably positionable upon said base to accommodate wheels of different diameters.

3. An apparatus according to claim 2 further comprising means for preventing said barrel member from rotating with respect to said base, wherein said barrel member defines a hole therein, and wherein said means for preventing comprises:
   a bracket member secured to said base and defining a hole therein; and
   a lock pin insertable through said hole in said bracket member; wherein when said barrel member is rotated to place said ramp member in the loaded position, said hole in said barrel member aligns with said hole in said bracket member, whereby said lock pin is insertable through both said holes thereby locking said barrel against rotary movement.

4. An apparatus according to claim 1 wherein said lower anterior wheel stop member comprises at least one planar surface mounted upon said base at an angle with respect to the supporting surface.

5. An apparatus according to claim 4 wherein said lower anterior wheel stop member further comprises a pair of sides disposed at angles with respect to said one planar surface.

6. An apparatus according to claim 1 further comprising:
   a vertical support member extending upward from said base; and
   a support arm member attached to said upper anterior wheel support member and slidably movable in relation to said vertical support member, whereby said support arm member is positionable at a plurality of distances above said base such that said support arm member may be raised and lowered to accommodate wheels of different diameters.

7. An apparatus according to claim 6 further comprising:
   an upper horizontal slide rod attached to said vertical support member;
   at least one medial sleeve rotatably disposed around said medial slide rod; and
   means for releasably securing said at least one medial sleeve against movement in relation to said upper slide rod; wherein said at least one upper anterior wheel support member is rigidly connected to said at least one sleeve, and wherein said at least one sleeve is selectively positionable along said upper slide rod to accommodate wheels of different widths.

8. An apparatus according to claim 6 further comprising;
   a medial horizontal slide rod attached to said support arm member;

at least one medial sleeve rotatably disposed around said medial slide rod;

at least one upper anterior wheel support member rigidly connected to said at least one medial sleeve; and means for releasably securing said sleeve against movement in relation to said medial slide rod; wherein said at least one medial sleeve is selectively positionable along said medial slide rod to accommodate wheels of different widths.

9. A stand apparatus for securing a two wheeled vehicle in an upright, parked position, the vehicle having wheels rotatably mounted upon axles whereby the wheels may be used to roll the vehicle across a supporting surface and on and off the stand apparatus, said apparatus comprising:

a base disposable upon the supporting surface;

at least one lower anterior wheel stop member positioned above said base;

at least one upper anterior wheel support member positioned above said base;

a horizontal cylindrical barrel member rotatably mounted upon said base;

at least one lower posterior wheel support member movably connected to said barrel member;

at least one sleeve member rotatably disposed around said barrel member;

means for releasably securing said sleeve against movement in relation to said barrel member;

a support rod member rigidly extending between said at least one sleeve member and said lower posterior wheel support, wherein said sleeve member is selectively positionable along said barrel member to accommodate wheels of different widths; and a planar parking ramp member rigidly attached tangentially to said barrel;

wherein when the vehicle rolls on said apparatus, said parking ramp member rotates with said barrel member from an unloaded position to a loaded position.

10. An apparatus according to claim 9 wherein said lower anterior wheel stop member comprises at least one planar surface mounted upon said base at an angle with respect to the supporting surface.

11. An apparatus according to claim 10 wherein said lower anterior wheel stop member further comprises a pair of sides disposed at angles with respect to said one planar surface.

12. An apparatus according to claim 9 further comprising:

a vertical support member extending upward from said base; and a support arm member attached to said upper anterior wheel support member and slidably movable in relation to said vertical support member, whereby said support arm member is positionable at a plurality of distances above said base such that said support arm member may be raised and lowered.

13. An apparatus according to claim 12 further comprising:

an upper horizontal slide rod attached to said vertical support member;

at least one medial sleeve rotatably disposed around said medial slide rod; and means for releasably securing said at least one medial sleeve against movement in relation to said upper slide rod; wherein said at least one upper anterior wheel support member is rigidly connected to said at least one sleeve, and wherein said at least one sleeve is selectively positionable along said upper slide rod to accommodate wheels of different widths.

14. An apparatus according to claim 12 further comprising;

a medial horizontal slide rod attached to said support arm member;

at least one medial sleeve rotatably disposed around said medial slide rod;

at least one upper anterior wheel support member rigidly connected to said at least one medial sleeve; and means for releasably securing said sleeve against movement in relation to said medial slide rod;

wherein said at least one medial sleeve is selectively positionable along said medial slide rod to accommodate wheels of different widths.

* * * * *